(12) United States Patent
Chen et al.

(10) Patent No.: US 6,858,045 B2
(45) Date of Patent: Feb. 22, 2005

(54) METHOD OF MANUFACTURING AN ELECTROLYTIC CELL

(75) Inventors: Hancun Chen, Williamsville, NY (US); Weitung Wang, East Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 63 days.

(21) Appl. No.: 10/306,163

(22) Filed: Nov. 29, 2002

(65) Prior Publication Data

US 2004/0104519 A1 Jun. 3, 2004

(51) Int. Cl.[7] .................... H01M 2/14; B29C 27/02
(52) U.S. Cl. ............. 29/623.5; 29/623.1; 427/115; 205/115; 205/188; 361/500; 361/525
(58) Field of Search ............... 29/623.1, 623.5; 205/115, 188; 361/500, 525; 427/115

(56) References Cited

U.S. PATENT DOCUMENTS

| | | | | |
|---|---|---|---|---|
| 4,218,275 A | * | 8/1980 | Kadija et al. .............. 156/73.1 |
| 4,283,264 A | * | 8/1981 | Darling et al. .............. 204/252 |
| 4,310,608 A | * | 1/1982 | Dodin et al. ................ 429/131 |
| 4,339,549 A | * | 7/1982 | Tsushima et al. ............. 521/28 |
| 4,537,673 A | * | 8/1985 | Asawa et al. ............... 204/253 |
| 5,085,742 A | * | 2/1992 | Dollard et al. .............. 205/188 |
| 5,358,735 A | * | 10/1994 | Kawasaki et al. ........... 427/115 |
| 5,484,503 A | * | 1/1996 | Grot ............................ 156/333 |
| 5,688,293 A | * | 11/1997 | Oliver et al. .............. 29/623.1 |
| 5,762,741 A | * | 6/1998 | Kodokian ................... 156/153 |
| 6,165,533 A | * | 12/2000 | Laughlin et al. ............ 426/549 |

* cited by examiner

*Primary Examiner*—Mark Ruthkosky
(74) *Attorney, Agent, or Firm*—David M. Rosenblum

(57) ABSTRACT

A method of manufacturing an electrolytic cell in which an intermediate sintered form is produced that comprises a porous anode layer and an electrolyte layer having a pre-specified shape of the electrolytic cell. The electrolyte layer has defects extending through the electrolyte layer. A substance by way of a pressure, a solvent, particle suspended in a solvent or particles introduced by way of thermal spray are introduced into defects within the electrolyte layer. Thereafter, a green cathode layer is applied to the electrolyte layer while the substance is in place, within the defects. The intermediate sintered form with the applied green cathode layer is then fired to produce the electrolytic cell.

10 Claims, 2 Drawing Sheets

METHOD OF MANUFACTURING AN ELECTROLYTIC CELL

U.S. Government Rights

This invention was made with U.S. Government support under Cooperative Agreement No. 70NANBOH3052 awarded by the National Institute of Standards and Technology (NIST). The U.S. Government has certain rights in this invention.

FIELD OF THE INVENTION

The present invention relates to a method of manufacturing an electrolytic cell of the type that employs an electrolyte that conducts oxygen ions to separate oxygen when an electrical potential is applied across the electrolyte. More particularly, the present invention relates to such a method in which a substance is introduced into defects within the electrolyte during formation of the electrolytic cell to prevent such defects from becoming pathways for electrical shorting of the electrolytic cell.

BACKGROUND OF THE INVENTION

An electrolytic cell is a layered structure that has anode and cathode electrode layers sandwiching an electrolyte layer that is formed of a solid oxide such as yttria stabilized zirconia or gadolinium doped ceria. When an electrical potential is applied across to the electrodes, oxygen, in an oxygen containing feed, ionizes to produce oxygen ions which are transported through the electrolyte. The oxygen ions emerge from the electrolyte and recombine to form elemental oxygen.

Electrolytic cells can be in the form of flat plates or tubes. The electrodes and electrolyte can be supported on an inert supporting structure such as alumina or the electrode serving as the anode can be configured to provide the support. Electrolytic cells are formed by either applying the anode layer to the inert support or forming the anode layer into the desired shape of the electrolytic cell, for instance, a tube. Thereafter, the electrolyte layer is applied to the anode layer and the structure is fired to burn out binders and to sinter the ceramic and thereby to produce a sintered intermediate form. A cathode layer located opposite to the anode is formed by applying a green cathode layer onto the electrolyte layer. The resultant structure is further fired to sinter the cathode layer. The various layers can be formed and applied by known techniques such as extrusion, tape casting, and slurry dipping.

The anode and cathode layers can be formed of metallic, electrically conductive materials, mixtures of mixed conductors (materials that conduct both oxygen ions and electrons), ionic conductors (materials that solely conduct oxygen ions) and metallic conductors. Typical mixed conductors are various known perovskites and typical purely ionic conductors are yttria-stabilized zirconia or gadolinium doped ceria.

The application of the electrolyte layer and the cathode layer is extremely important in the fabrication of the electrolytic cell. If the electrolyte layer has defects, that extend through the electrolyte layer, such as pin holes, the material forming the cathode can penetrate such defects to provide an electrical pathway between the cathode and the anode. This electrical pathway, known as a "short", will make the electrolytic cell non-functional.

In current manufacturing technologies, electrolytic cells are prone to shorting after sintering. In fact, manufacturing yields can be quite low, less than 40%. The reason for the low productivity is believed to be related to the fact that the dense electrolyte film is typically very thin, about 25 microns, and cannot sinter to 100% of its theoretical density using current available technology. The electrolyte layer more or less will contain a certain degree of defects which can be of a sub-micron scale. The production of the cathode layer, particularly when applied by way of a slurry solution, utilizes the application of fine particles that are of the same scale as defects existing within the electrolyte. Such fine particles are able to penetrate the defect and thereby produce the short between the cathode and the anode.

The prior art has attempted to solve this problem in different ways. In one example, disclosed in U.S. Pat. No. 5,358,735, the electrolyte layer is applied to a porous anode layer by thermal spraying. The electrolyte is then impregnated with a solution of a metal compound consisting of at least one metal selected from the group of magnesium, iron, cobalt, nickel, copper and zinc. In U.S. Pat. No. 5,085,742, a solid oxide fuel cell fabrication is disclosed in which the electrolyte layer is plasma sprayed. Defects are plugged using an EVD coating. The plugs form due to a reaction between vapors feeding from the electrolyte side and oxygen feeding from the porous support side. U.S. Pat. No. 6,165,553 discloses spraying a liquid polymer precursor on a thin-film surface. The liquid is selectively wicked into open pores of the film to effectively plug pores that would otherwise exist within the electrolyte layer. The treated sample is then heated to high temperature to create solid plug in the pores of the film.

Plugs formed by impregnation of a metal solution or special precursor into pores of the electrolyte can leave gaps within the electrolyte due to shrinkage during firing. As a result, defects will be produced by the resultant gaps. EVD processing has the disadvantage of taking time and thereby decreasing production rate. Additionally, EVD adds expense to the production by increasing the initial capital investment involved in obtaining the necessary equipment.

As will be discussed, the present invention provides a simple process that can be used to cure detects within the electrolyte layer that would otherwise lead to shorting that is more effective than the prior art and can be applied by techniques that are less involved and less expensive than those of the prior art.

SUMMARY OF THE INVENTION

The present invention relates to a method of manufacturing an electrolytic cell in which an intermediate sintered form is produced that comprises a porous anode layer and an electrolyte layer having a pre-specified shape of electrolytic cell. The electrolyte layer has defects that extend through the electrolyte layer. A substance is introduced into the defects within the electrolyte layer. A green cathode layer is applied to the electrolyte layer while the substance is in place, within the defects. The intermediate sintered form, after application of the green cathode layer, is then fired to produce the electrolytic cell.

Unlike the prior art, the electrolyte layer is fully sintered and a substance is introduced to plug the defects. In such a simple manner, electrical shorting between the anode and cathode layers is prevented.

The substance can be in the form of inert gas that exerts a positive pressure against the electrolyte, through the porous anode layer. The substance can be a solvent that is introduced into the defects within the electrolyte by dipping. The substance can be solid particles applied by coating the electrolyte with a suspension of the solid particles within a solvent. The solid particles can also be applied by thermally spraying the solid particles onto the electrolyte layer.

Where the substance is an inert gas, the green cathode layer is applied by dipping the intermediate sintered form into a slurry and maintaining a positive pressure at least during the drying of the slurry, but preferably, also during firing of the green cathode layer. Where the substance is solid particles applied by coating the electrolyte with the suspension, the solid particles preferably have a size of less than about 1.0 micron, more preferably less than 0.5 microns, and the solid particles can be in a concentration within the solvent of less than about 15% by weight, preferably less than 5% by weight. The solvent can be toluene, acetone, ethanol, isopropanol, ethylene glycol or water. The application of the suspension produces a coating having a thickness of no more than about 10.0 microns, preferably less than 5.0 microns. Where solid particles are plugged by thermally spraying the solid particles onto the electrolyte layer, the solid particles preferably have a size of less than about 1.0 micron, more preferably less than 0.5 microns. The solid particles are preferably sprayed in the form of agglomerates of between about 15.0 and 30.0 microns in size and the thermal spraying produces a thermal spray layer of less than about 15.0 microns, preferably less than 10.0 microns.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
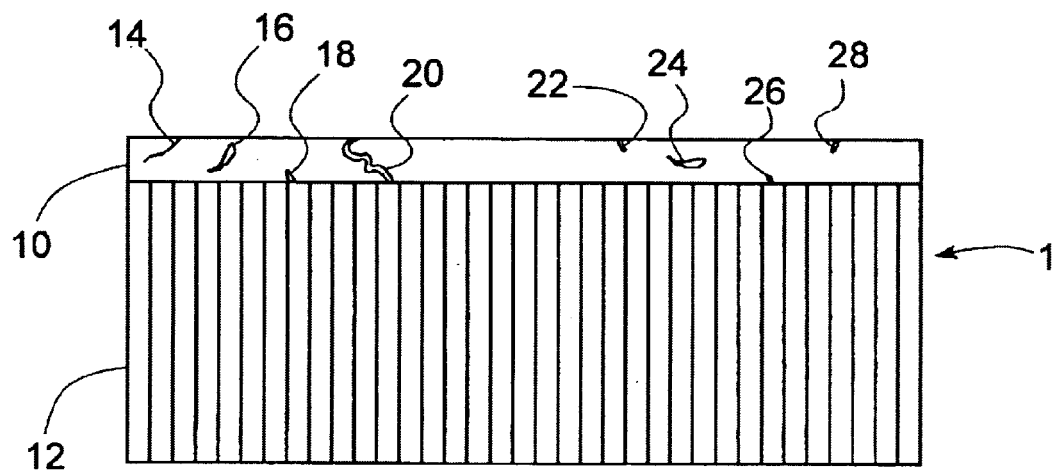
FIG. 1 is a schematic sectional view of an intermediate sintered form having defects penetrating through the electrolyte layer.

With reference to FIG. 1 an intermediate sintered form 1 is disclosed that has an electrolyte layer 10 and a porous anode layer 12 to form the anode electrode. The intermediate sintered form 1 is a structure that can be of any shape, such as a flat plate or a tube. Furthermore, it is produced in a conventional manner such as by extrusion of the anode layer 12 (in case of a tube) and then dip coating the anode layer 12 with the electrolyte layer 10. After drying, the resultant green form is then fired to burn out binders and pore formers and then sintered to produce the intermediate sintered form 1.

It to be noted that intermediate sintered form 1 is illustrated with the single anode layer 12 for purposes of simplicity of explanation. It is understood, however, that an anode electrode could have a plurality of layers in which the particle size is graded as well as the material composition for thermal compatibility purposes.

As is known to those skilled in the art, in order to achieve superior cell performance, electrolyte layer 10 should be as thin as possible, preferably less than 25 microns thick. As illustrated, electrolyte layer 10 has defects 14 through 28. These defects are in a sub-micron or even a nano-micron range. Of particular interest for purposes of explanation is defect 20.

Figure 2:
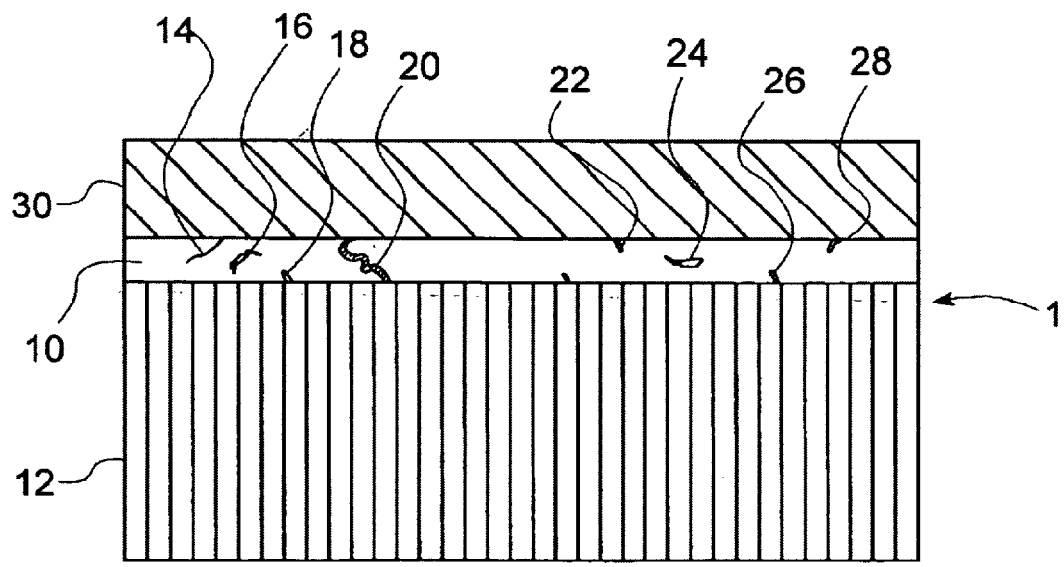
FIG. 2 is a schematic sectional view of a prior art electrolytic cell in which cathode material has penetrated the defect in the electrolyte layer to produce a short between the cathode layer and the anode layer.

With reference to FIG. 2, cathode layer 30 can be applied to electrolyte layer 10 of intermediate sintered form 1 by way of a slurry solution that is made up of materials that have electronic conductivity. The materials can be a mixed conductor such as strontium doped lanthanum cobalt iron oxide or a mixture of an ion conducting material and an electrically conductive metal or metal alloy such as silver or a silver and lead mixture. The ideal cathode electrode should be porous with small pore sizes. The slurry cathode coating application contains small particles suspended in solution with sizes in sub-micron ranges. As a result, when the cathode coating is applied onto the electrolyte layer 10, the fine particles suspended in the slurry solution enter defects, such as defect 20, under capillary action and thereby further penetrate electrolyte layer 10 creating an electrical contact between the anode 12 and the cathode 30. As stated above, the resultant electrical short prevents the finished electrolyte cell from operating properly.

In accordance with the present invention, the defects within electrolyte layer 10, such as defect 20, are filled with a substance after the production of intermediate sintered form 1, but before the cathode coating takes place. While the substance is in place, the cathode coating is applied on top of electrolyte layer 10. The substance prevents penetration of the coating material used in forming cathode layer 30 into the electrolyte layer 10.

Figure 3:
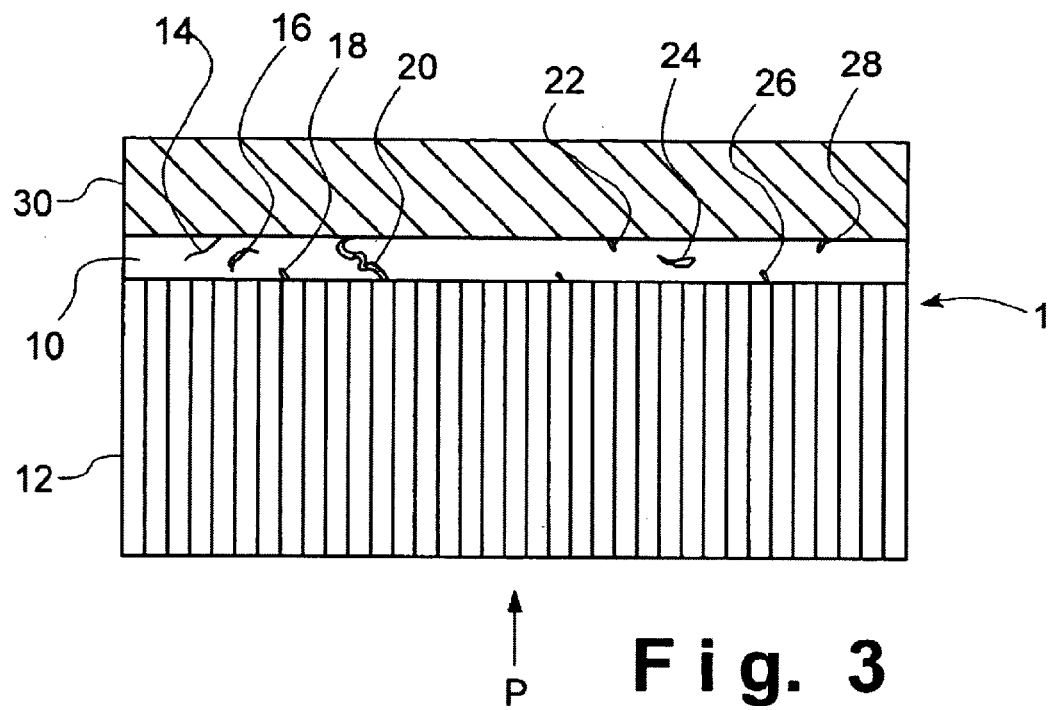
FIG. 3 is a schematic sectional view illustrating a method in accordance with the present invention.

In the present invention as shown in FIG. 3, a pressure "P" is applied from porous anode 12. The pressure may be exerted by pressurized nitrogen. As long as the positive pressure is maintained, the material used in forming cathode layer 30 will be prevented from penetrating defects such as pin holes and microcracks. The gas can be any kind, such as air, nitrogen or helium as long as it does not cause any damage by, for instance, a corrosion reaction. Air is preferred in that it is economically available. The positive pressure "P" is maintained during the application of the green cathode layer and also preferably during the sintering of the green cathode layer.

It is to be noted that a pressure should not be set too high or too low. If the pressure is too high the integrity of cathode layer 30 or electrolyte layer 10 will be damaged. If the pressure is too low, the gas flow will not completely fill the defects within electrolyte layer 10. Preferably, the pressure used is less than about 50 psia, more preferably less than about 20 psia and most preferably less than about 10 psia.

The formation of the green cathode layer on electrolyte layer 10 includes dipping the sintered intermediate form into a cathode-containing slurry solution, drying the dipped form, and then firing the form to remove organic binders and to sinter the cathode layer 12.

As described above, a positive pressure should be maintained to provide gas substance to the defects within electrolyte layer 10 so that the slurry solution penetration is prevented during the dipping stage. It has been found that the gaseous pressure of the substance is preferably continued to provide substance to the defects during the coating and drying process to prevent fine particles from falling into the cathode coating. The drying process takes place immediately after completion of the dipping. It can be accomplished using any kind of appropriate heating source, such as a heating lamp, an oven, or a furnace, which should be able to heat a cathode coating or the intermediate sintered form to anywhere from between about 100° C. and 200° C.

Because the green cathode layer coating is still in a green state with poor bonding between particles, drying may cause the coating to shrink and thus, particles, especially fine ones, can fall into defects such as defect 20 and electrolyte layer 10. Therefore, continuously maintaining the positive pressure and thus providing the gas substance into defects within electrolyte layer 10 is preferred. The pressure for application at this stage can be the same as used in the dipping stage. It can be slightly different if desired. In order to prevent combustion, non-flammable gas such as air, nitrogen and helium should be used.

After drying, the green cathode coating is fired to sinter the particles making up the cathode and thus form a firm bonding between particles in cathode layer 30. The sintering temperature can be in a range of between about 800° C. and 1200° C. During sintering, the positive pressure is preferably maintained until the end of the sintering process to prevent any particles from falling into defects such as defect 20.

Figure 4:
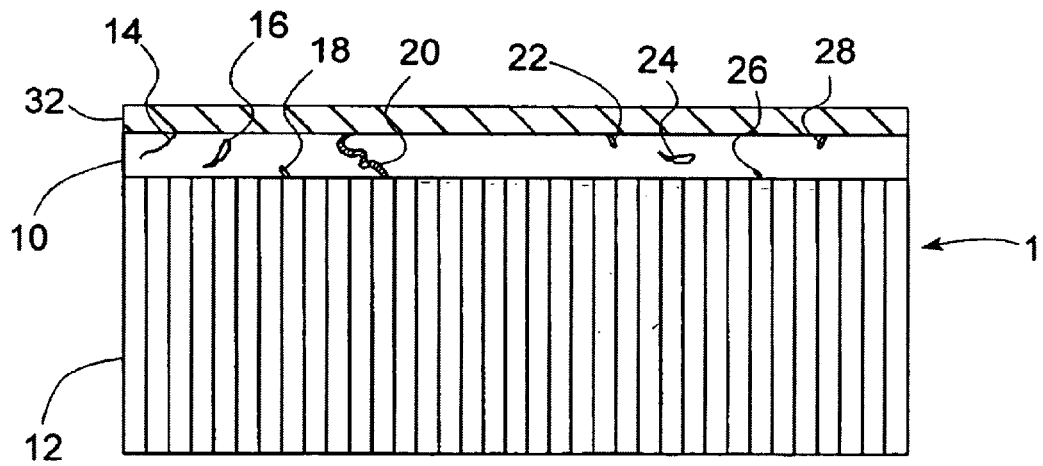
FIG. 4 is schematic sectional view illustrating an alternative embodiment of an application of the method in accordance with the present invention.

With reference to FIG. 4, in an alternative embodiment, defects such as 20 within electrolyte layer 10 can be filled by coating electrolyte layer with either a solvent alone or a solvent containing a solid suspension prior to the cathode coating to produce a coating 32. The solvent or the solvent containing the suspension substance is introduced into defects such as defect 20 by dipping. The solvent can be any kind but it should be able to evaporate easily from the defects of electrolyte layer 30 at room temperature or by heating after completion of the dipping. The solvent should not cause any contamination to electrolyte layer 30. The solvent should have an appropriate wetability for the specific electrolyte layer and an appropriate evaporation rate so that it can penetrate the defects under capillary action to allow a sufficient amount to remain in the defects. The selection of the solvent is based on the material of electrolyte layer 10. Examples of a suitable solvent are toluene, acetone, ethanol, isopropanol, ethylene glycol, and even water. The materials for the solid particles should be electrically non-conductive such as an insulator. The particle size should be slightly smaller size of the defects so that the particles carried in the solvent can penetrate the defects. In this regard, the particle size is preferably less than about 1.0 microns and more preferably, less than about 0.5 microns.

The concentration of particles in the solvent should be designed as not to provide an obvious coating thickness of coating 32, that is less than about 10.0 microns, preferably less than about 5.0 microns, by single dipping over electrolyte layer 10. The percentage by weight of solid materials is less than about 15%, preferably less than about 5%. Because defects, such as defect 20 in electrolyte layer 10 are filled with solvent solution, cathode slurry penetration into electrolyte layer 10 and defects such as defect 20 can be prevented during subsequent cathode coating processes to produce cathode layer 30. The solvent can then evaporate from the defects during the cathode coating drying stage. If a solvent suspension is used, solid particles will remain within defects such as defect 20 after evaporation of the solvent. The solid particles within defects 20 can further present falling of cathode particles during subsequent processing, for instance binder burn out and sintering.

The substance used to fill the defects of the cathode can also be in a solid form using an appropriate coating method such as thermal spray to produce a coating that can be visualized as coating 32. The particle size used for the thermal spray should be slightly smaller than the defect sizes within electrolyte layer 10. It is preferably in the sub-micron range of less than about 1.0 micron, more preferably less than about 0.5 microns. To improve flowability, agglomerated powders with an average particle size range of between about 15.0 microns and about 30.0 microns are preferred. The agglomerates will break into the original fine particles during the thermal spraying deposit on the defects within the electrolyte layer 10. The thickness of the thermal spray layer should be optimized so that the coating material mostly fills the defects without building obvious thickness. Preferably the thickness of the thermal spray layer is less than about 15.0 microns, preferably less than about 10.0 microns. The material used for the thermal spray can be an insulator or the same as the electrolyte 10 or cathode coating 30.

In the following examples, sintered intermediate forms of tubular configuration were produced having an electrolyte layer 10 consisting a dense gadolinium doped cerium oxide ("CGO") film on a porous anode layer 12 formed of two subsidiary layers, the underlying substrate layer was formed of a mixture of about 50% by weight of strontium doped lanthanum cobalt iron oxide ("LSCF") and about 50% by weight of CGO. An interfacial layer was formed between the substrate layer and the electrolyte layer 10. Such interfacial layer was formed of a mixture containing about 30% by weight LSCF and about 70% by CGO.

The forgoing structure was manufactured by preparing a powder mixture containing about fifty grams of LSCF powder having particle sizes less than about 30 $\mu$m, about fifty grams of CGO powder having particle sizes less than about 30 $\mu$m, and about seventeen and a half grams of graphite pore former having particle sizes of less than about 74 $\mu$m. The mixture was placed into a plastic vial with a few methacrylate mixing balls. The vial was then inserted into a SPEX CERTIPREP Mixer/Mill and mixed for 10 minutes. A polyurethane bag was placed over a mandrel, 9.5 mm in diameter, and the prepared mixture was slowly poured into the bag to the desired volume as the bag and mandrel were vibrated. The bag was then capped and iso-statically pressed at 20 kpsi for 2 minutes. After iso-pressing, the bag was removed and the mandrel was withdrawn leaving a green tube. The green tube was loaded into a furnace and heated at a rate of about 1° C. per minute under ambient air to 700° C. for 2 hours to remove the graphite pore former. The heating ramp was then increased to 2° C. per minute to 950° C. and held at such temperature for about 4 hours. The furnace was cooled to room temperature at the rate of 2° C. per minute.

The resultant tube was coated with the porous interfacial layer by dipping the tube into a first slurry solution containing about 70% by weight of CGO and about 30% by weight of LSCF with an average particle size of 1.2 $\mu$m. The interfacial layer was formed with a thickness of about 15 $\mu$m. Once the coating was dry, the composite tube was heated at 1° C. per minute in ambient air to 700° C. for 2 hours. The furnace was cooled to room temperature at a rate of 2° C. per minute.

The resultant anode layer 12 was coated with the electrolyte layer 10 by dipping anode layer 12 into a second slurry solution containing CGO with an average particle size of 0.5 $\mu$m. The resultant electrolyte layer 10 was formed with a thickness of about 15 $\mu$m. The coated tube was then loaded back into the furnace and heated at between about 1° C. and about 2° C. per minute under ambient air to about 1335° C. After sintering at this temperature for 4 hours, the furnace was cooled to room temperature at the rate of 2° C. per minute.

The slurry solution used for the cathode coatings in the following examples are toluene-based with viscosity of about 200 centipoise (c.p.). The particle sizes in the slurry were in the range from about 0.1 to about 1.2 microns with an average of about 0.5 microns.

EXAMPLE 1

An electrolytic cell was fabricated in accordance with prior art techniques and without utilization of the present invention. The intermediate sintered form produced in the manner outlined above, was dipped into a slurry solution containing LSCF and allowed to soak for a few seconds. The coated tube was then carefully drawn out of the slurry and allowed to partially dry in a fume hood for about 5 minutes. Thereafter, the tube was completely dried in an oven at a temperature of about 200° C. for abut 30 minutes. The dried tube was finally loaded into a furnace and heated at about 1° C. per minute under ambient air to about 450° C. and held at such temperature for about 1 hour to remove the organic binder in the coating. The heating ramp was increased to 2° C. per minute to about 900° C. for 4 hours to sinter the coating. The furnace was cooled to room temperature at the rate of 2° C. per minute. The cathode layer 30 prepared in this manner was found to be porous with a porosity of from between about 30% and about 40% and with a thickness of about 50 microns.

The resultant electrolytic cell was then evaluated for shorting by performing an RT resistance test. The resistance was found to be 0.0025 MΩ (2.5 kΩ). The electrolytic cell was considered to be electrically shorted and was rejected.

EXAMPLE 2

An electrolytic cell was fabricated in accordance with the current invention. The sintered intermediate tube was formed in the manner outlined above and a cathode layer 30 was applied in the manner outlined in Example 1. The tube was attached to an air source and 4 psi pressure was applied to the inside of the tube which was maintained during the entire processing steps of Example 1. The cathode coating prepared this way was found to be porous with a porosity of between about 30% and about 40% and a thickness of about 50 microns.

The resultant electrolytic cell was then evaluated for shorting by performing a RT resistance test. The resistance was found to be 3.7 MΩ. The electrolytic cell was considered to be non-electrically shorted and therefore passed inspection.

EXAMPLE 3

A sintered intermediate form was prepared in the manner described above and was attached to an air source. A 4-psi pressure was applied to the inside of the tube. The tube was then dipped into a slurry solution containing about 50% by weight of LSCF and about 50% by weight of Ag. After a few seconds had elapsed, the coated tube was carefully drawn out of the slurry and allowed to partially dry in a fume hood for about 5 minutes. The tube was completely dried in an oven of about 200° C. for about 30 minutes. During the entire drying process, the air pressure inside the tube was maintained at about 4 psi. The dried tube was disconnected with the air source and loaded into a furnace. It was heated at about 1° C. per minute in ambient air to about 450° C. and held at such a temperature for about 1 hour to remove the organic binder in the coating. The heating ramp was increased to about 2° C. per minute to about 900° C. and held for 4 hours to sinter the coating. The furnace was cooled to room temperature at the rate of about 2° C. per minute. The cathode layer 30 prepared in such manner was found to be porous with a porosity of between about 30% and about 35% and had a thickness of about 50 mircrons.

The resultant electrolytic cell was then evaluated for shorting by performing a RT resistance test. The resistance was found to be 10.3 MΩ. The electrolytic cell was therefore not shorted.

EXAMPLE 4

A sintered intermediate tubular form was prepared in the manner described above and was plasma-sprayed. A powder containing about 50% by weight LSCF and about 50% by weight CGO. The resulting cathode layer had a thickness of about 10 microns. The powder used for plasma spraying was agglomerated and had a primary particle size of between about 0.3 and about 0.5 microns. The plasma spraying was used to create solid substance in the defects of the CGO electrolyte layer. After spraying, the tube was dipped into a slurry solution containing about 30% by weight LSCF and the remainder silver. After a few seconds had elapsed, the tube was carefully drawn out of the slurry and allowed to partially dry in a fume hood for about 5 minutes. The tube was completely dried in an oven of about 200° C. for about 30 minutes. The dried tube was loaded into a furnace and heated at about 1° C. per minute in ambient air to 450° C. and held for about 1 hour to remove the organic binder. The heating ramp was increased to about 2° C. per minute to 900° C. and held for 4 hours to sinter the coating. The furnace was cooled to room temperature at the rate of about 2° C. per minute. The cathode coating prepared this way was found to be porous with a porosity of between about 30% and about 35% and had a thickness of around 50 microns.

The resultant electrolytic cell was then evaluated for shorting by performing a RT resistance test. The resistance was found to be 1.0 MΩ which indicated that the cell was not shorted.

While the present invention has been described with reference to preferred embodiment, as will occur to those skilled in the art, numerous changes, additions and omissions can be made without departing from the spirit and scope of the present invention.

We claim:

1. A method of manufacturing an electrolytic cell comprising:

producing an intermediate sintered form comprising a porous anode layer and an electrolyte layer having a pre-specified shape of said electrolytic cell;

the electrolyte layer having defects extending through said electrolyte layer;

introducing a substance into defects within the electrolyte layer;

applying a green cathode layer to the electrolyte layer while said substance is in place, within the defects, thereby to form a green form; and firing said intermediate sintered form after application of said green cathode layer to produce said electrolytic cell.

2. The method of claim 1, wherein said substance is an inert gas exerting a positive pressure against said electrolyte layer, through said porous anode layer.

3. The method of claim 1, wherein said substance is a solvent introduced into the electrolyte layer by dipping the intermediate sintered form.

4. The method of claim 1, wherein said substance is solid particles applied by coating said electrolyte layer with a suspension of said solid particles within a solvent.

5. The method of claim 1, wherein said substance is solid particles applied by thermally spraying said solid particles onto said electrolyte layer.

6. The method of claim 2, wherein:
   said green cathode layer is applied by dipping said intermediate sintered form into a slurry; and
   said positive pressure is maintained at least during the drying of said slurry.

7. The method of claim 4, wherein:
   said solid particles have a size of less than about 1.0 micron;
   said solid particles are in a concentration within said solvent of less than about 15% by weight;
   said solvent is toluene, acetone, ethanol, isopropanol, ethylene glycol or water; and
   the application of said suspension produces a coating having a thickness of no more than about 10.0 microns.

8. The method of claim 4, wherein:
   said solid particles have a size of less than about 0.5 micron;
   said solid particles are in a concentration within said solvent of less than about 5% by weight;
   said solvent is toluene, acetone, ethanol, isopropanol, ethylene glycol or water; and
   the application of said suspension produces a coating having a thickness of no more than about 5.0 microns.

9. The method of claim 5, wherein:
   said solid particles have a size less than about 1.0 micron;
   said solid particles are agglomerated into agglomerates of between about 15.0 and about 30.0 microns in size; and
   said thermal spraying produces a thermal spray layer of less than about 15 microns.

10. The method of claim 5, wherein:
   said solid particles have a size less than about 0.5 microns;
   said solid particles are agglomerated into agglomerates of between about 15.0 and about 30.0 microns in size; and
   said thermal spraying produces a thermal spray layer of less than about 10 microns.

* * * * *